(12) United States Patent
Nakagawa et al.

(10) Patent No.: US 7,165,737 B2
(45) Date of Patent: Jan. 23, 2007

(54) SPOOL BRAKING DEVICE FOR DUAL-BEARING REEL

(75) Inventors: Shouji Nakagawa, Osaka (JP); Takeshi Ikuta, Osaka (JP); Ken'ichi Kawasaki, Osaka (JP); Hiroaki Kuriyama, Osaka (JP)

(73) Assignee: Shimano Inc., Osaka (JP)

( * ) Notice: Subject to any disclaimer, the term of this patent is extended or adjusted under 35 U.S.C. 154(b) by 0 days.

(21) Appl. No.: 11/319,582

(22) Filed: Dec. 29, 2005

(65) Prior Publication Data

US 2006/0169813 A1    Aug. 3, 2006

(30) Foreign Application Priority Data

Jan. 18, 2005    (JP)    ............................. 2005-010201
Feb. 28, 2005    (JP)    ............................. 2005-053579

(51) Int. Cl.
*A01K 89/01* (2006.01)

(52) U.S. Cl. ...................... 242/288; 188/161
(58) Field of Classification Search ............... 242/286, 242/288, 223; 188/67, 156–159, 161, 162, 188/164

See application file for complete search history.

(56) References Cited

U.S. PATENT DOCUMENTS 6,412,722 B1 *  7/2002  Kreuser et al. ............. 242/288
6,973,999 B1 * 12/2005  Ikuta et al. ................. 188/161

FOREIGN PATENT DOCUMENTS

JP    11-332436 A    12/1999
JP    2000-217478 A   8/2000

* cited by examiner

*Primary Examiner*—Emmanuel M Marcelo
(74) *Attorney, Agent, or Firm*—Global IP Counselors, LLP

(57) ABSTRACT

A spool braking device for a dual-bearing reel that applies a braking force to a spool during casting includes a spool brake unit, a switch element, a casting state detecting device and a spool control device. The spool brake unit is configured to brake the spool and includes a rotor having a plurality of magnets and a plurality of coils. The magnets are arranged along a rotational direction with alternating polarities. The coils are arranged to be spaced apart in a circumferential direction. The coils have end faces that are arranged to face a side face of the rotor. Each of the coils has a winding diameter that is larger than a full length of the coil. The casting state detecting device is configured to detect a casting state. The spool control device is configured to control an on/off status of the switch element based on the casting state.

20 Claims, 12 Drawing Sheets

SPOOL BRAKING DEVICE FOR DUAL-BEARING REEL

CROSS-REFERENCE TO RELATED APPLICATIONS

This application claims priority to Japanese Patent Application Nos. 2005-010201 and 2005-053579. The entire disclosure of Japanese Patent Application Nos. 2005-010201 and 2005-053579 is hereby incorporated herein by reference.

BACKGROUND OF THE INVENTION

1. Field of the Invention

The present invention generally relates to a spool braking device. More specifically, the present invention relates to a spool braking device for a dual-bearing reel that is used during casting and is configured to brake a spool in an electrically controllable manner.

2. Background Information

Conventional electrically controllable spool braking devices have a spool brake unit and a spool control unit, which is configured to electrically control the spool brake unit. (See, for example, Japanese Laid-Open Patent Publication No. 11-332436.)

In this spool braking device, the spool brake unit has a plurality of magnets, a plurality of coils and a switch element or microprocessor. The magnets are mounted around an outside circumference of a spool shaft on an outside of the spool. The coils are arranged radially such that the end faces thereof face toward the radially-outward-facing sides of the magnets. The spool control unit is configured to identify a peak time during which the spool rotates at a maximum rotational velocity and control the spool brake unit based on the identified peak time.

In this spool braking device, the magnets are arranged around the outside circumference of the spool shaft on the outside of the spool and the coils are arranged radially such that the end faces thereof face toward the radially-outward-facing surfaces of the magnets. When the coils are arranged in a radial pattern, the dimension of each coil in the axial direction of the spool is not particularly large. However, the radial arrangement of the coils causes the surface area of coils in a plane perpendicular to the spool shaft to be large and, thus, causes a dimension of the reel body along a diameter of the spool shaft to be large, thereby increasing the size of the dual-bearing reel.

In a spool brake device presented in Japanese Laid-Open Patent Publication No. 2000-217478, a spool brake unit has a plurality of magnets, a plurality of coils and a switch element. The magnets are fixed to an internal circumferential surface of a tubular bobbin trunk of a spool. The spool is mounted in a freely rotatable manner on a spool shaft. The coils are mounted to the spool shaft so as to be spaced from one another along a circumferential direction. The coils are arranged such that they can face the radially-inward-facing sides of the magnets. The switch element is connected to both ends of the coils. A spool control unit is configured to control a braking force by controlling an on/off status of the switch element. More specifically, the spool control unit detects a tensile force acting on a fishing line based on a change in rotational velocity of the spool. The spool control unit brakes the spool by short circuiting the switch element when the tensile force becomes equal to or smaller than a prescribed value.

In this spool braking device, the magnets are arranged on the internal circumference of the tubular bobbin trunk and the coils are arranged on the spool shaft so as to be positioned radially inward relative to the magnets. Since the spool brake unit is arranged inside the tubular bobbin trunk of the spool, the dimension along a diameter of the spool shaft can be made smaller than in the spool braking device described in Japanese Laid-Open Patent Publication No. 11-332436. However, in the case of a dual-bearing real having a spool that has a small-diameter tubular bobbin trunk, a spool brake unit that is arranged inside the tubular bobbin trunk of the spool cannot be used because there is not sufficient space to arrange the spool brake unit. Thus, in such reels, the spool braking unit must be arranged on the outside of the spool in the manner of the spool braking device described in Japanese Laid-Open Patent Publication No. 11-332436. When the spool braking unit is arranged on the outside of the spool due to the tubular bobbin trunk being small, the dimension of the reel body along the axial direction of the spool becomes large and, again, the size of the dual-bearing reel increases.

In view of the above, it will be apparent to those skilled in the art from this disclosure that there exists a need for an improved spool braking device that limits the increase in size of the dual-bearing reel when the spool braking device is arranged on the outside of the spool. This invention addresses this need in the art as well as other needs, which will become apparent to those skilled in the art from this disclosure.

SUMMARY OF THE INVENTION

The object of the present invention is to provide a spool braking device for a dual-bearing reel that can suppress the increase in the size of the reel that occurs when the spool braking device is arranged on the outside of the spool.

A spool braking device for a dual-bearing reel in accordance with a first aspect of the present invention is a device that includes a spool braking unit, a switch element, a casting state detecting device, and a spool control device. The spool braking unit is configured to brake a spool. The spool braking unit includes a rotor with a plurality of magnets and a plurality of coils. The magnets are arranged along a rotational direction with alternating polarities. The coils are arranged to be spaced apart in a circumferential direction. The rotor is configured and arranged to rotate together with the spool. The coils have end faces that are arranged to face a side face of the rotor. The coils are connected in series to form a coil sequence. Each of the coils has a winding diameter that is larger than a full length of the coil in a direction parallel to a center axis of the spool. The switch element is connected to both ends of the coil sequence. The casting state detecting device is configured to detect a casting state. The spool control device configured to control an on/off status of the switch element based on the casting state.

With this spool braking device, when the user casts, the spool rotates in a direction of reeling-out the fishing line. Thus, the fishing line is dispensed from the spool. When the spool rotates, the coils cross through the magnetic lines of force emanating from the rotor and the coil generates electricity. When the switch element is turned on, the electric power generated by the coil is converted into heat and consumed, thereby braking the spool. The on/off state of the switch element is controlled by the spool control device in accordance with the casting state detected by the casting state detecting device. Thus, the braking force applied to the spool varies during casting. In this spool braking unit, the end faces of the coils are arranged so as to face a side face of the rotor. Consequently, it is not necessary to arrange the coils and magnetic poles inside the spool. For example, the rotor can be arranged on the outside surface of a flange part of the spool. Furthermore, since the winding diameter of the coils is larger than the axial length (dimension along the center axis) of the coils, the dimension of the spool in the direction along the center axis can be made the same as the dimension in which a conventional braking device is stored even if the coils are arranged, for example, such that they face a flange part of the spool. Since the end faces of the coils are arranged to face toward a side face of the rotor, the increase in the diametric dimension of the spool is suppressed even if the spool braking unit is arranged on the outside of the spool. Since the coils with the axial length that is smaller than the winding diameter are used, the increase in the axial length of the spool is suppressed even if the spool braking unit is arranged on the outside of the spool. As a result, the increase in the size of the reel that results when the spool braking device is arranged on the outside of the spool is suppressed.

A spool braking device for a dual-bearing reel in accordance with a second aspect of the present invention is a device as recited in the first aspect of the present invention, wherein the casting state detecting device has a tensile force detecting device configured to detect a tensile force acting on a fishing line dispensed from the spool during casting.

With this spool braking device, since the spool is braked by detecting the tensile force as the casting state, the spool is braked in such a manner that the tensile force is as small as possible and the terminal tackle can be cast far away.

A spool braking device for a dual-bearing reel in accordance with a third aspect of the present invention is a device as recited in the second aspect of the present invention, wherein the coils are wound in the shapes of fans centered on axes parallel to the center axis of the spool and arranged so as to be centered about the center axis and have spaces there-between in a circumferential direction. Each of the coils is configured such that the dimension thereof in a direction parallel to the center axis is equal to or less than ¼ of a diagonal dimension thereof that correspond to the maximum winding diameters thereof.

With this spool braking device, since the dimension of each coil along the direction of the center axis, i.e., the full length of the coil, is ¼ or less of the maximum winding diameter of the coil, i.e., the length of a diagonal of the coil, the coil surface area is made large even if the overall length is short by making the winding diameter large. As a result, a sufficient braking force is maintained while suppressing the increase in the dimension of the reel that is oriented along the direction of the center axis of the spool.

A spool braking device for a dual-bearing reel in accordance with a fourth aspect of the present invention is a device as recited in any one of the first through third aspects of the present invention, wherein the magnets are fixed to a flange part of the spool and arranged along a rotational direction centered on the center axis of the spool such that the polarities thereof differ in an alternating fashion.

With this spool braking device, since the rotor is made up of magnets arranged such that the polarities thereof differ in an alternating fashion, the structure of the rotor is simpler and less expensive than, for example, a rotor made by magnetizing a cylindrical molded magnet.

A spool braking device for a dual-bearing reel in accordance with a fifth aspect of the present invention is a device as recited in any one of the first through fourth aspects of the present invention, wherein, the spool control device has a circuit board that is mounted to a surface of the reel body and has the coils attached thereto. A plurality of control elements is mounted to the circuit board.

With this spool braking device, since the circuit board is mounted to a surface of the reel body that faces one of the end faces of the spool, the coils arranged facing the perimeter of the rotor are attached directly to the circuit board. As a result, it is not necessary to have a lead wire connecting the coils to the circuit board and the occurrence of defective insulation between the coils and the circuit board is reduced. Moreover, since the coils are mounted to a circuit board that is mounted to the rear body, the coils are mounted to the reel body by merely attaching the circuit board to the reel body. Thus, the device is assembled more easily.

A spool braking device for a dual-bearing reel in accordance with a sixth aspect of the present invention is a device as recited in the fifth aspect of the present invention, wherein the circuit board is a washer-shaped ring member that is arranged substantially coaxially with respect to the center axis of the spool and has a cut-out portion formed along a radial direction.

With this spool braking device, since the circuit board is a washer-shaped ring-like member and is arranged substantially coaxially with respect to the center axis of the spool. The coils are arranged so as to be substantially coaxial with respect to the center axis of the spool by merely mounting the circuit board to the reel body. Also, since a cut-out portion is provided in the circuit board, the drive portion of a level wind mechanism and/or a sound generating mechanism is arranged in the cut-out portion in an overlapping manner with respect to the circuit board.

A spool braking device for a dual-bearing reel in accordance with a seventh aspect of the present invention is a device as recited in any one of the first through sixth aspects of the present invention, wherein the spool control device is configured to electrically control the spool braking unit in such a manner that when the tensile force detected by the tensile force detecting device is equal to or smaller than a first prescribed value, the spool is braked with a prescribed first braking force for the duration of a first prescribed time period.

With this spool braking device, the spool is braked comparatively strongly during the period immediately after casting when the rotational velocity is comparatively fast, thereby causing the tensile force to increase rapidly. Thus, backlashing is prevented and the terminal tackle flies in a stable manner. As a result, backlashing is prevented while enabling the terminal tackle to be cast a farther distance with a stable attitude.

With the present invention, since the end faces of the coils are arranged to face toward a side face of the rotor, the increase in the diametric dimension of the spool is suppressed even if the spool braking unit is arranged on the outside of the spool. Since the coils that have the axial length smaller than the winding diameter are used, the increase in the axial length of the spool is suppressed even if the spool braking unit is arranged on the outside of the spool. As a result, the increase in the size of the reel that results when the spool braking unit is arranged on the outside of the spool is suppressed.

These and other objects, features, aspects and advantages of the present invention will become apparent to those skilled in the art from the following detailed description, which, taken in conjunction with the annexed drawings, discloses preferred embodiments of the present invention.

BRIEF DESCRIPTION OF THE DRAWINGS

Referring now to the attached drawings which form a part of this original disclosure.

DETAILED DESCRIPTION OF THE PREFERRED EMBODIMENTS

Selected embodiments of the present invention will now be explained with reference to the drawings. It will be apparent to those skilled in the art from this disclosure that the following descriptions of the embodiments of the present invention are provided for illustration only and not for the purpose of limiting the invention as defined by the appended claims and their equivalents.

Figure 1:
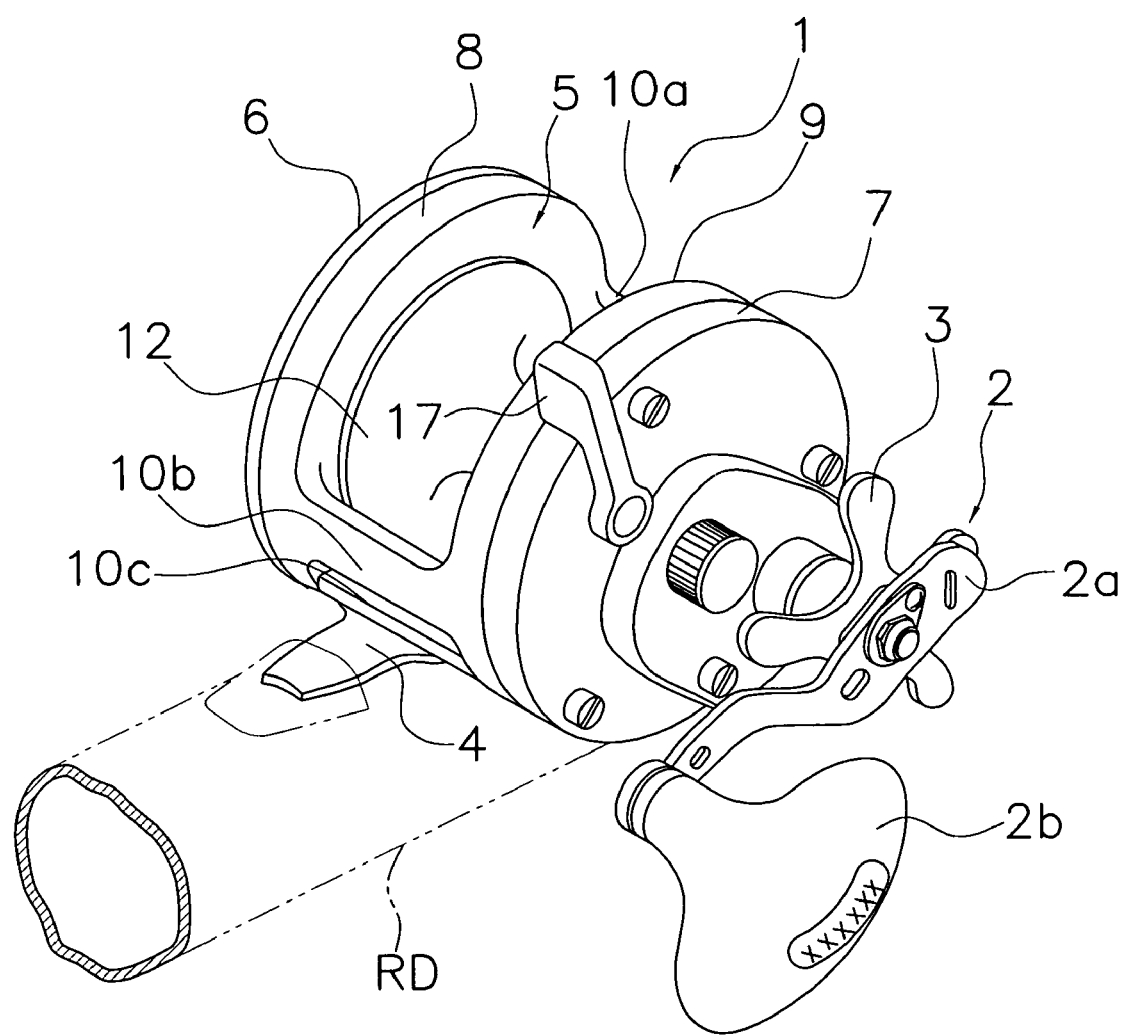
FIG. 1 is a perspective view of a dual-bearing reel that is equipped with a spool braking device in accordance with a first embodiment of the present invention.

Referring initially to FIG. 1, a dual-bearing reel is illustrated in accordance with a first embodiment of the present invention. The dual-bearing reel is, for example, a medium-sized round reel capable of carrying approximately 300 meters of number 5 (line diameter is about 0.370 mm and about 20 lb load) fishing line. The dual-bearing reel includes a reel body 1, a handle assembly 2 and a star drag 3. The handle assembly 2 is arranged on a side of the reel body 1. The star drag 3 is arranged on a side of the handle assembly 2 nearest the reel body 1. This dual-bearing reel is not provided with a level wind mechanism.

Figure 2:
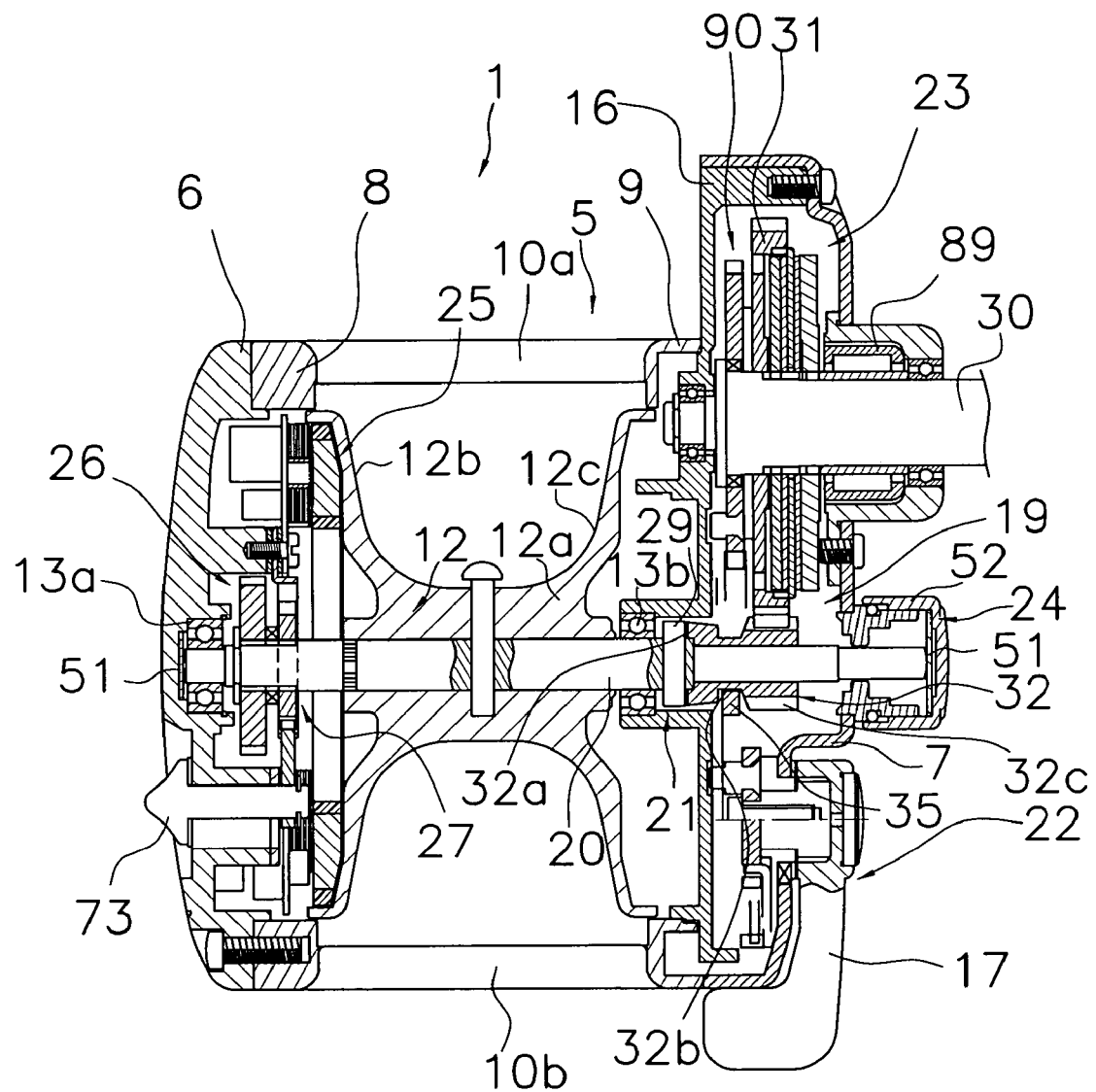
FIG. 2 is a cross-sectional view of the dual-bearing reel with the spool braking device illustrated in FIG. 1 in accordance with the first embodiment of the present invention.

As shown in FIGS. 1 and 2, the reel body 1 includes a rod mounting leg 4, a frame 5 and first and second covers 6 and 7. The first and second covers 6 and 7 cover sides of the frame 5. The rod mounting leg 4 enables the reel body 1 to be mounted to a fishing rod RD. The frame 5 has left and right side plates 8 and 9 and a plurality of connecting members 10a, 10b and 10c that link the left and right side plates 8 and 9 together. Referring to FIG. 2, a mechanism mounting plate 16 is mounted to the second cover 7. The mechanism mounting plate 16 is arranged to form a space between the mechanism mounting plate 16 and the second cover 7 for storing various mechanisms.

The frame 5 is made by die casting. The second cover 7 is made by press forming sheet metal. The left and right side plates 8 and 9 and the first cover 6 are each circular when viewed from a side. Outside circumferential surfaces of the left and right side plates 8 and 9 and the first cover 6 are, for example, machined using a lathe or other tool.

The second cover 7 and the mechanism mounting plate 16 are configured such that a portion of the circular shape thereof protrudes radially outward when viewed from a side. The second cover 7 also bulges axially outward at a region centered where a handle shaft 30 is mounted. A spool 12 for winding the fishing line is mounted in a freely rotatable manner inside the frame 5 of the reel body 1. The handle assembly 2 is configured to rotate the spool 12.

The connecting members 10a, 10b and 10c are shaped to follow the contour of outside circumferences of the left and right side plates 8 and 9. The connecting members 10a, 10b and 10c have a plurality of plate-like members formed integrally and homogeneously with the left and right side plates 8 and 9. The connecting members 10a, 10b and 10c join the left and right side plates 8 and 9 together at, for example, three locations: a frontal portion; a rearward portion; and a lower portion of the reel body 1. Since the left and right side plates 8 and 9 and the connecting members 10a, 10b and 10c are formed as an integral, homogeneous unit, it is difficult for warping or other deformation to occur even if the reel body 1 is subjected to a large load. Thus, deterioration of the wind-up efficiency caused by large loads is prevented. The outer circumferential portions of the connecting members 10a, 10b and 10c and the left and right side plates 8 and 9 are integral with each other and machined in the same fashion as the first cover 6.

The rod mounting leg 4 is fixed to the connecting member 10c. The rod mounting leg 4 is arranged along a center position between the left and right side plates 8 and 9. This center position is also the center position of a tubular bobbin trunk 12a of the spool 12.

Figure 3:
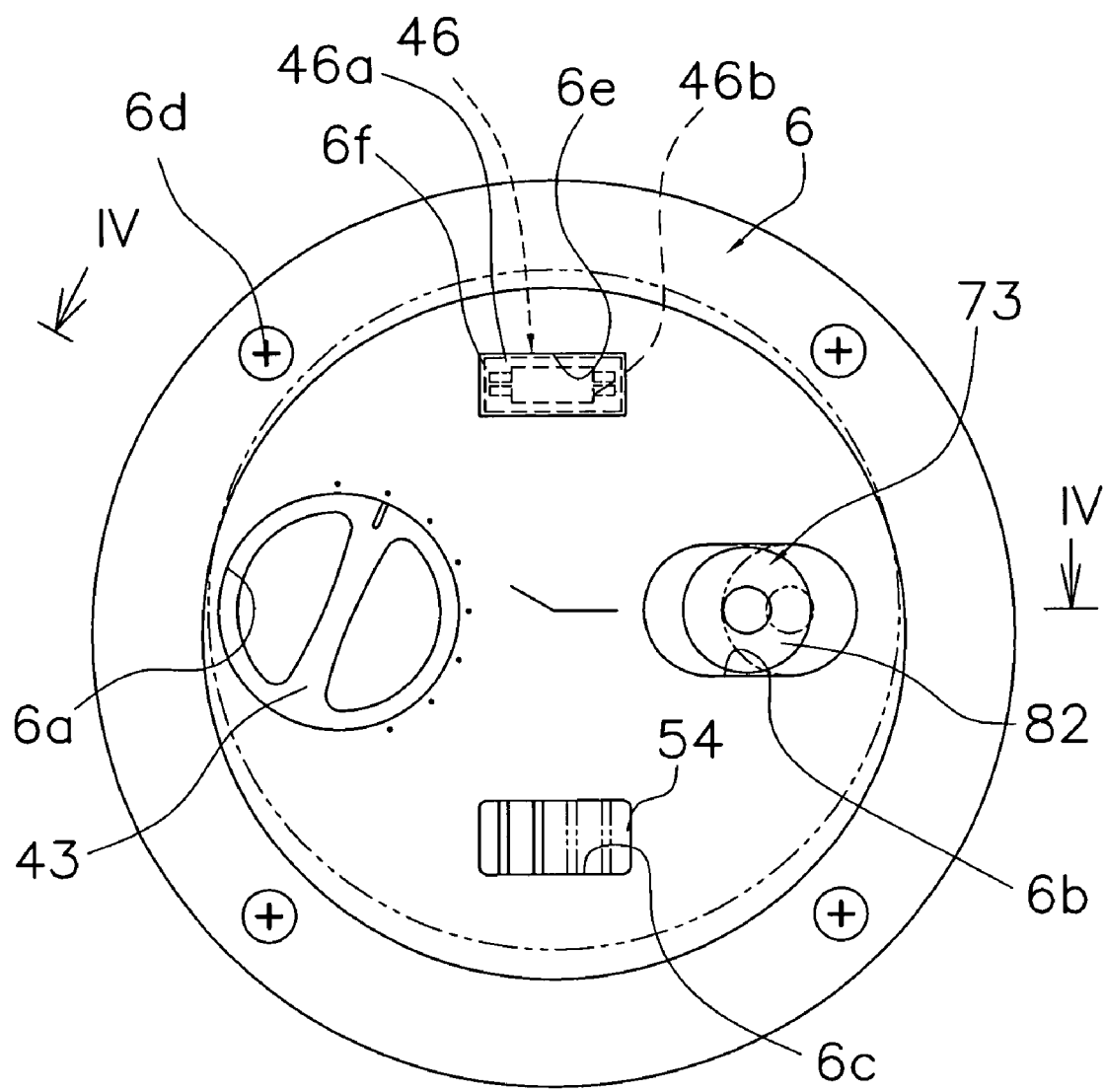
FIG. 3 is a side view of a left side of the dual-bearing reel illustrated in FIG. 1 in accordance with the first embodiment of the present invention.

As shown in FIG. 3, the first cover 6 includes a circular opening 6a, an oval opening 6b, a rectangular opening 6c, a threaded member 6d, a rectangular window 6e and a cover member 6f. As shown in FIG. 3, the first cover 6 is screw-fastened to the left side plate 8 with the threaded member 6d. The circular opening 6a is provided in the first cover 6 for exposing a braking strength adjusting knob 43. The oval opening 6b is provided on a right side of the circular opening 6a for exposing a sound generation on/off knob 82. The rectangular opening 6c is provided diagonally downward of the circular opening 6a for exposing a spool lock knob 54. The rectangular window 6e exposes a display surface of a display unit 46. The rectangular window 6e is provided diagonally upward from the circular opening 6a.

The cover member 6f is made of a transparent resin. The cover member 6f is fixed to the rectangular window 6e. The cover member 6f protects the display surface of the display unit 46.

As shown in FIG. 1, the handle assembly 2 includes a crank arm 2a and a handle grip 2b. The handle grip 2b is mounted to an end of the crank arm 2a in such a manner that the handle grip 2b freely rotates about an axis oriented perpendicularly with respect to the end of the crank arm 2a. The crank arm 2a is mounted in a non-rotatable manner to a tip of the handle shaft 30. The crank arm 2a is bent at an intermediate location in such a fashion that the handle grip 2b is brought closer to the reel body 1.

The spool 12 is arranged between the left and right side plates 8 and 9, as shown in FIG. 2. The spool 12 is furnished with the tubular bobbin trunk 12a and left and right flange parts 12b and 12c. The left and right flange parts 12b and 12c are formed integrally and homogeneously with a left and right end of the tubular bobbin trunk 12a, respectively. A spool shaft 20 passes through a center of the spool 12. The spool shaft 20 is fixed to the center of the spool 12.

Referring to FIG. 2, the spool shaft 20 is made of a non-magnetic metal, such as stainless steel SUS304. The spool shaft 20 passes through the mechanism mounting plate 16 and extends outside the second cover 7. The spool shaft 20 is supported in a freely rotatable manner on the reel body 1 by means of first and second bearings 13a and 13b. The first bearing 13a is mounted to the first cover 6. The second bearing 13b is mounted to the mechanism mounting plate 16. An engaging pin 29 is installed so as to pass diametrically through the spool shaft 20 at a portion where the spool shaft 20 passes through the mechanism mounting plate 16.

Still referring to FIG. 2, the following are arranged in the space between the mechanism mounting plate 16 and the second cover 7: a gear mechanism 19; a clutch mechanism 21; a clutch control mechanism 22; a drag mechanism 23; and a casting control mechanism 24. The gear mechanism 19 transfers torque from the handle assembly 2 to the spool 12. The clutch control mechanism 22 is provided at an intermediate position of the gear mechanism 19. The clutch control mechanism 22 serves to connect and disconnect from the rotation of the handle assembly 2. The clutch control mechanism 22 turns the clutch mechanism 21 on and off. The drag mechanism 23 is configured to brake the spool 12 when it rotates in the direction of reeling-out the fishing line. The casting control mechanism 24 adjusts a resistance force that acts when the spool 12 rotates.

In addition, a spool lock mechanism 26 and a spool sound generating mechanism 27 are arranged inside the first cover 6 on an outward side of the left side plate 8. The spool sound generating mechanism 27 selectively switches between a sound enabled state in which the sound generating mechanism 27 generates a sound when the spool 12 rotates and a sound disabled state in which the sound generating mechanism 27 does not generate a sound. The spool lock mechanism 26 selectively switches between a reverse rotation prohibited state in which rotation of the spool 12 in a direction of reeling out the fishing line (reverse rotation) is prohibited regardless of the state of the clutch mechanism 21 and a reverse rotation allowed state in which reverse rotation is allowed. A spool braking mechanism 25 is configured to brake the spool 12 during casting or the like in an electrically controllable manner. The spool braking mechanism 25 is arranged between the spool 12 and the first cover 6.

The gear mechanism 19 includes the handle shaft 30, a main gear 31 and a cylindrical pinion gear 32. The cylindrical pinion gear 32 meshes with the main gear 31. The main gear 31 is fixed to the handle shaft 30. The handle shaft 30 is mounted to the mechanism mounting plate 16 and the second cover 7 in a freely rotatable manner. The rotation (i.e., reverse rotation) of the handle shaft 30 in the direction of reeling-out the fishing line is prohibited by a roller-type one-way clutch 89 and a claw-type one-way clutch 90. The roller-type one-way clutch 89 is mounted between the second cover 7 and the handle shaft 30. The main gear 31 is mounted in a freely rotatable manner to the handle shaft 30 and connected to the handle shaft 30 through the drag mechanism 23.

The pinion gear 32 is a cylindrical member that extends inward from outside the side plate 9. The spool shaft 20 passes through the center of the pinion gear 32. The pinion gear 32 is mounted on the spool shaft 20 in such a manner that it freely moves along the spool shaft 20 in an axial direction. The pinion gear 32 includes a meshing groove 32a, a constricted section 32b and a gear section 32c. The meshing groove 32a, with which the engaging pin 29 meshes, is formed at an end of the pinion gear 32 (a left end in FIG. 2). The meshing groove 32a and the engaging pin 29 constitute the clutch mechanism 21. The constricted section 32b is formed on an intermediate portion of the pinion gear 32. The gear section 32c meshes with the main gear 31. The gear section 32c is formed on a right end of the pinion gear 32.

The clutch control mechanism 22 has a clutch operating lever 17 and a clutch yoke 35. The clutch yoke 35 is configured to engage with the constricted section 32b and move the pinion gear 32 along the axial direction of the spool shaft 20. A clutch operating lever 17 is mounted in a freely pivotal manner to a side face of a rearward part of the second cover 7. In response to a pivotal operation of the clutch operating lever 17, the clutch yoke 35 moves the pinion gear 32 along the axial direction of the spool 12 and switches the clutch mechanism 21 between a clutch ON state and a clutch OFF state. When the pinion gear 32 is moved along the spool shaft 20 such that the meshing groove 32a meshes with the engaging pin 29, torque is transmitted between the spool shaft 20 and the pinion gear 32 in a connected state. This state is the clutch ON state. When the meshing groove 32a and the engaging pin 29 are separated from each other, torque is not transmitted between the spool shaft 20 and the pinion gear 32. This state is the disconnected state (clutch OFF state). In the clutch OFF state, the spool 12 rotates freely. An urging member (not shown) applies a force to the clutch yoke 35 in such a direction that the meshing groove 32a engages with the engaging pin 29, i.e., a force loading the clutch yoke 35 toward the clutch ON state. The clutch control mechanism 22 has a clutch return mechanism (not shown) configured to turn the clutch mechanism 21 on when the spool 12 rotates in the line wind-up (reeling-in) direction.

The casting control mechanism 24 is furnished with a plurality of friction plates 51 and a brake cap 52. The brake cap 52 regulates the force with which the friction plates 51 pinch the spool shaft 20. The friction plates 51 are arranged so as to sandwich both ends of the spool shaft 20. One of the friction plates 51 is mounted inside the first cover 6.

When the spool lock mechanism 26 is put into the reverse rotation prohibited state, the spool 12 is completely locked, which is convenient for cutting the fishing line when, for example, a tackle piece has become snagged.

Figure 4:
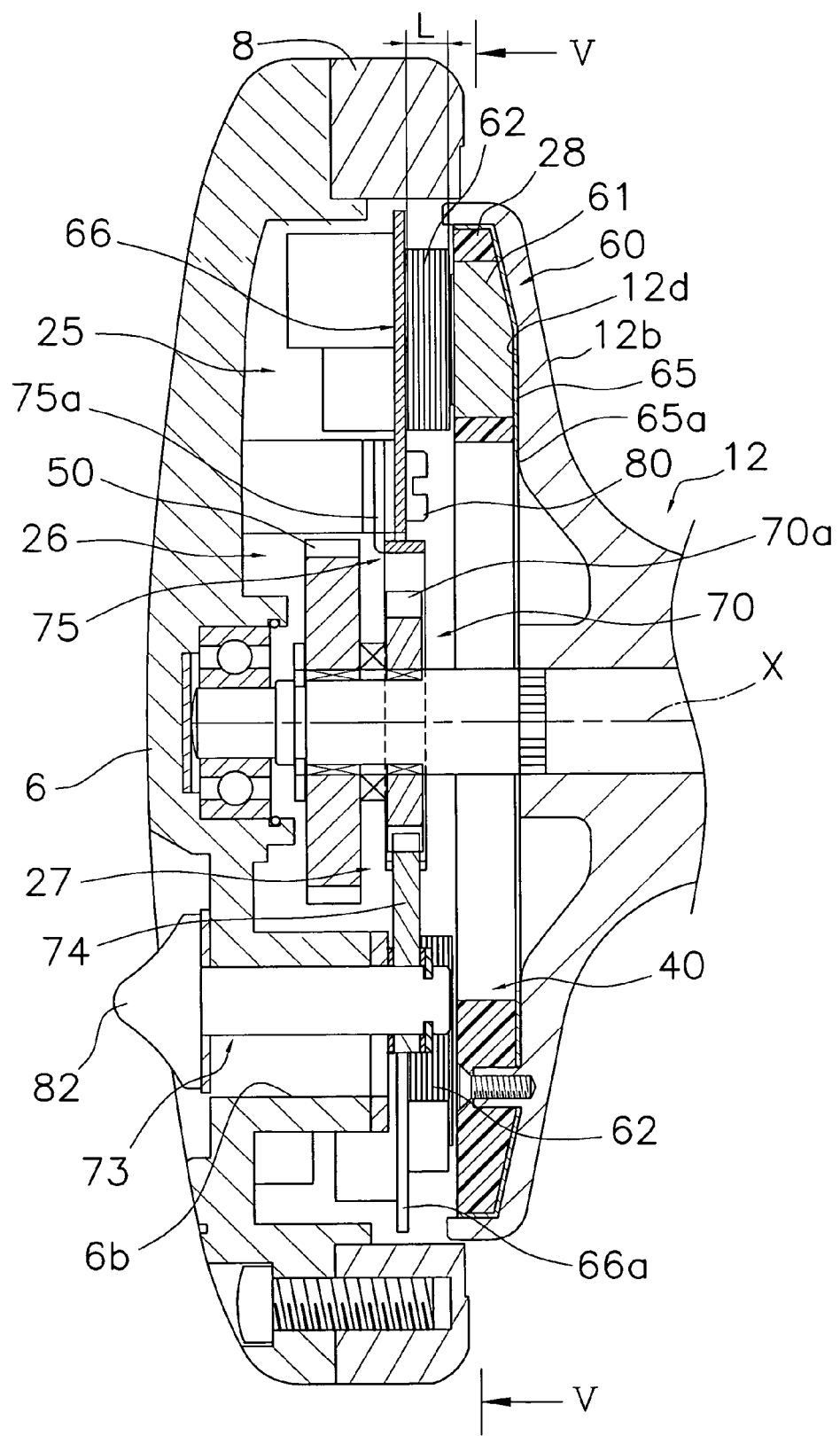
FIG. 4 is an enlarged partial cross-sectional view of the dual-bearing reel taken along the section line IV—IV of FIG. 3 in accordance with the first embodiment of the present invention.

As shown in FIG. 4, the spool lock mechanism 26 has a ratchet wheel 50 and a ratchet claw (not shown). The ratchet claw meshes with the ratchet wheel 50. The ratchet wheel 50 is mounted in a non-rotatable manner relative to the spool shaft 20. Using the spool lock knob 54, which is exposed through the rectangular opening 6c, the ratchet claw is moved between a locked position (double dot chain line in FIG. 3) in which it meshes with the ratchet wheel 50 and an unlocked position (solid line in FIG. 3) in which it separates from the ratchet wheel 50.

Figure 5:
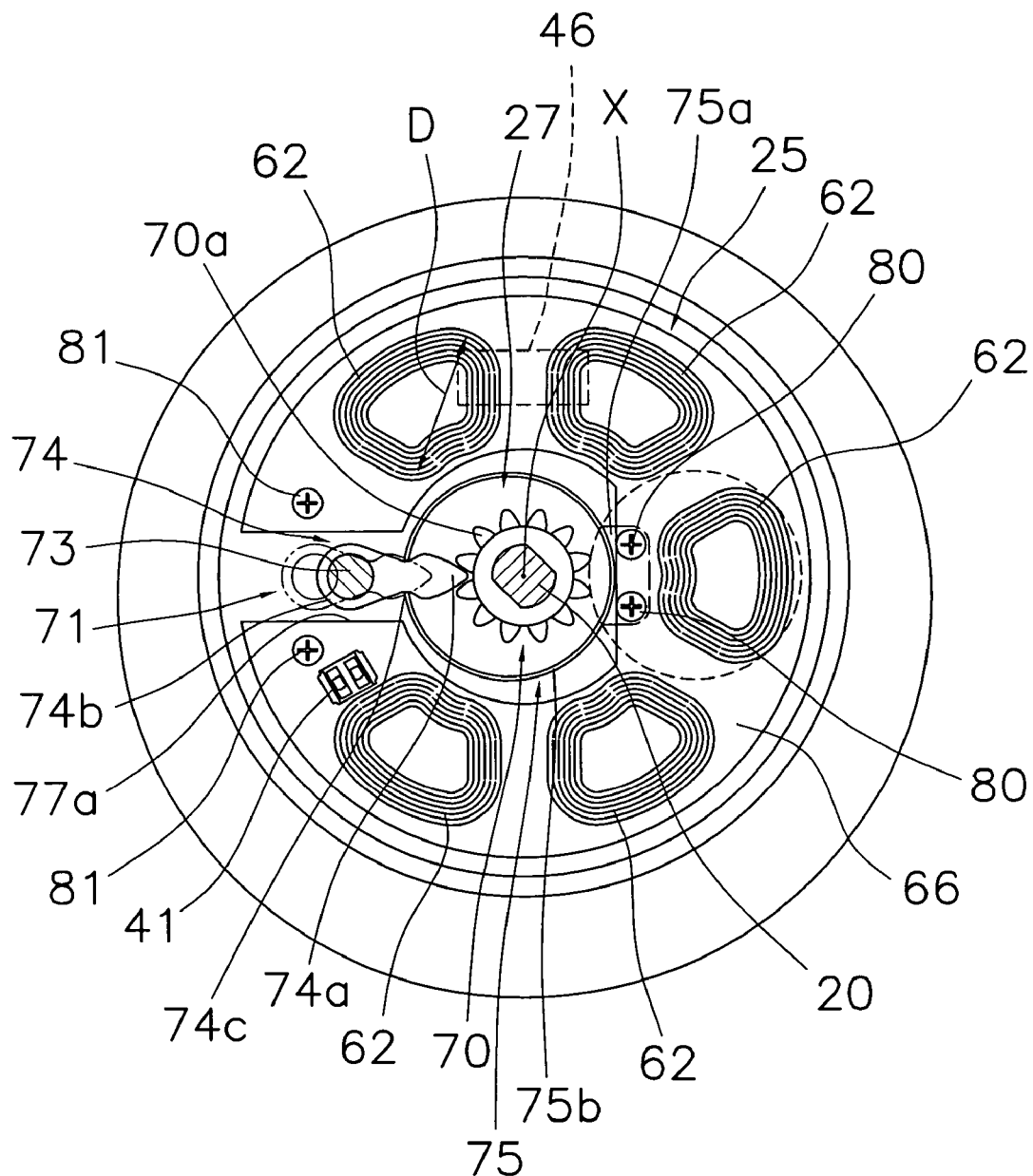
FIG. 5 is a cross-sectional view of the dual-bearing reel excluding the spool taken along the section line V—V of FIG. 4 in accordance with the first embodiment of the present invention.

The spool sound generating mechanism 27 is a mechanism configured to generate a sound in accordance with the rotation of the spool 12. Referring to FIGS. 4 and 5, the spool sound generating mechanism 27 includes a first sound generating part 70 and a second sound generating part 71. The second sound generating part 71 is configured and arranged to contact the first sound generating part 70. The first sound generating part 70 has protrusions 70a on an outside circumference of the first sound generating part 70. The first sound generating part 70 is mounted to the spool shaft 20 in a non-rotatable manner relative to the spool shaft 20

The first sound generating part 70 is mounted to the spool shaft 20 at a position that is closer to the spool 12 than the ratchet wheel 50. The first sound generating part 70 is a metal circular-disk-like member having multiple gear-tooth-like protrusions 70a arranged around the radially outward facing surface thereof. The protrusions 70a are arranged with spaces therebetween in the circumferential direction.

The second sound generating part 71 includes a pivot shaft 73, a claw member 74 and a force applying member 75. The force applying member 75 is arranged to bias the claw member 74 toward a neutral position where it contacts the protrusions 70a. The pivot shaft 73 is mounted to the first cover 6. The claw member 74 is mounted in a freely pivotal manner to the pivot shaft 73. The claw member 74 is arranged on the pivot shaft 73 such that a tip end of the claw member 74 is able to contact the protrusions 70a.

The pivot shaft 73 is configured and arranged in the first cover 6 to selectively move freely toward the first sound generating part 70 at a sound generating position and away from the first sound generating part 70 at a separated position. The tip end of the claw member 74 contacts the protrusions 70a at the sound generating portion. The claw member 74 is separated from the protrusions 70a at the separated position. The sound generation on/off knob 82 is formed on an end of the pivot shaft 73 opposite the claw member 74. The sound generation on/off knob 82 is arranged to be exposed through the oval opening 6b of the first cover 6. The sound generation on/off knob 82 is configured to be operated from outside the first cover 6 so as to move the pivot axis 73 to the sound generating position or the separated position.

Referring to FIG. 5, the claw member 74 is a metal member having a contact section 74a, a mounting section 74b and a constricted section 74c. The contact section 74a is a tapered, pointed contact section formed at a tip end of the claw member 74. The constricted section 74c is located between the contact section 74a and the mounting section 74b. The mounting section 74b is configured to be mounted in a freely pivotal manner to the tip end of a pivot support part of the pivot shaft 73. The contact section 74a is configured for contacting the protrusions 70a. The claw member 74 and the pivot shaft 73 are illustrated in FIG. 5 at the sound generating position by a solid line and at the separated position by a broken line.

Referring to FIGS. 4 and 5, the force applying member 75 is a metal spring member having a fixed part 75a and a spring part 75b. The spring part 75b curves from the fixed part 75a so as to pinch the constricted section 74c of the claw member 74 from both sides. The spring part 75b has ends that are arranged to face toward each other. The spring part 75b is curved into a C-shape. When the claw member 74 is in the sound generating position, tip ends corresponding to the open portion of the C-shape are arranged facing each other to pinch the constricted section 74c.

Referring to FIGS. 2–5 and 7, the spool braking mechanism 25 includes a spool brake unit 40, a rotational velocity sensor 41, a spool control unit 42 and the braking strength adjusting knob 43. The spool brake unit 40 is an instrument used for applying a braking force to the spool 12. The spool brake unit 40 is provided on the spool 12 and the reel body 1. The rotational velocity sensor 41 is a tensile force detecting instrument. The rotational velocity sensor 41 detects a tensile force acting on the fishing line dispensed from the spool 12 during casting. The spool control unit 42 is a spool control device that is configured to electrically control the spool brake unit 40 in accordance with one of eight braking patterns, each of which corresponds to a different braking strength level. The braking strength adjusting knob 43 is used to select one of the eight braking patterns. The braking strength adjusting knob 43 is mounted in a freely rotatable manner to the first cover 6.

The spool brake unit 40 is configured such that it is electrically controlled to brake the spool 12 by generating electricity. Referring to FIGS. 4–7, the spool brake unit 40 includes a rotor 60, a plurality of coils 62 and a switch element 63. The coils 62 are mounted to the reel body 1. The coils 62 are separated from each other along a circumferential direction. The coils 62 have end faces that are arranged in positions facing a side face of the rotor 60. The coils 62 are connected in series to form a coil sequence. The switch element 63 is connected to both ends of the coil sequence. Each coil 62 is configured to have a winding diameter that is larger than a full length of the coil 62. The rotor 60 has a plurality of magnetic poles that are arranged along a rotational direction. The magnetic poles have polarities that differ in an alternating fashion. The rotor 60 is configured and arranged to rotate together with the spool 12. The spool brake unit 40 is configured to generate an electric current due to the relative rotation between the rotor 60 and the coils 62. The spool brake unit 40 is further configured to brake the spool 12 by switching the electric current on and off using the switch element 63. The braking force produced by the spool brake unit 40 increases in accordance with the length of time the switch element 63 remains on.

The rotor 60 is furnished with six magnets 61 arranged in a rotational direction around the flange part 12b on the left side of the spool 12 and a magnet holding part 28. The magnet holding part 28 is configured to hold the six magnets 61 such that spaces exist between the magnets 61 along a circumferential direction. The six magnets 61 are arranged along the circumferential direction such that their polarities differ alternately. The magnet holding part 28 is a ring-shaped member made of a synthetic resin. The magnet holding part 28 is formed as an integral unit with the six magnets 61 by, for example, insert molding. A back surface of the magnets 61 and magnet holding part 28 is shaped to match an outside surface 12d of the flange part 12b of the spool 12. A dish-shaped cap member 65 made of a non-magnetic material and having a through hole in a center thereof is arranged between the outside surface 12d and the magnets 61 and the magnet holding member 28.

In order to enable the spool 12 to rotate smoothly, the coils 62 are of the coreless type and are not provided with yokes. As shown in FIGS. 4 and 5, there are five coils 62 arranged in five of six equally distributed locations along an imaginary circle such that one location is left without a coil. The core wire of each coil 62 is wound in a fan-like shape about an axis that is parallel to a center axis X of the spool shaft 20. It will be apparent to one of ordinary skill in the art from this disclosure that it is also acceptable to make the coils 62 out of core wire wound in a circular cylindrical shape or to provide a core.

The coils 62 are arranged along a circle centered on the center axis X with spaces there-between in the circumferential direction. In this way, the coils 62 are arranged such that, excluding the location that is without a coil, the wound core wires of the coils 62 face the magnets 61 and lie in the magnetic fields of the magnets 61. As a result, the electricity generating efficiency is increased and a high braking force is obtained.

The full length L of each coil 62 along the direction of the center axis X (see FIG. 4) is not more than ¼ the maximum value of the winding diameter, i.e., the diagonal dimension D (see FIG. 5). The five coils 62 are connected in series and the two ends of the resulting series of coils 62 are connected to the switch element 63. The coils 62 are arranged such that the distances between the coils 62 and the outside surfaces 61a of the magnets 61 are substantially constant. Consequently, the gaps between the coils 62 and the magnets 61 are held constant. The surface of each coil 62 is covered with an insulating film of varnish or the like. Since the end faces of the coils 62 are arranged to face toward a side face of the rotor 60, the increase in the diametric dimension of the spool 12 is suppressed even if the spool braking mechanism 25 is arranged on the outside of the spool 12. Since the coils 62 with the full length L that is smaller than the winding diameter D are used, the increase in the axial length of the spool 12 is suppressed even if the spool braking mechanism 25 is arranged on the outside of the spool 12.

The switch element 63 has, for example, two FETs (field effect transistors) that are connected in parallel and capable of high-speed on-off control. Drain terminals of the FETs are connected to the coils 62. The switch element 63 is mounted to the back surface of a circuit board 66 (i.e., the opposite surface as the front surface that faces toward the flange part 12a). The five coils 62 are mounted to the circuit board 66.

Figure 6:
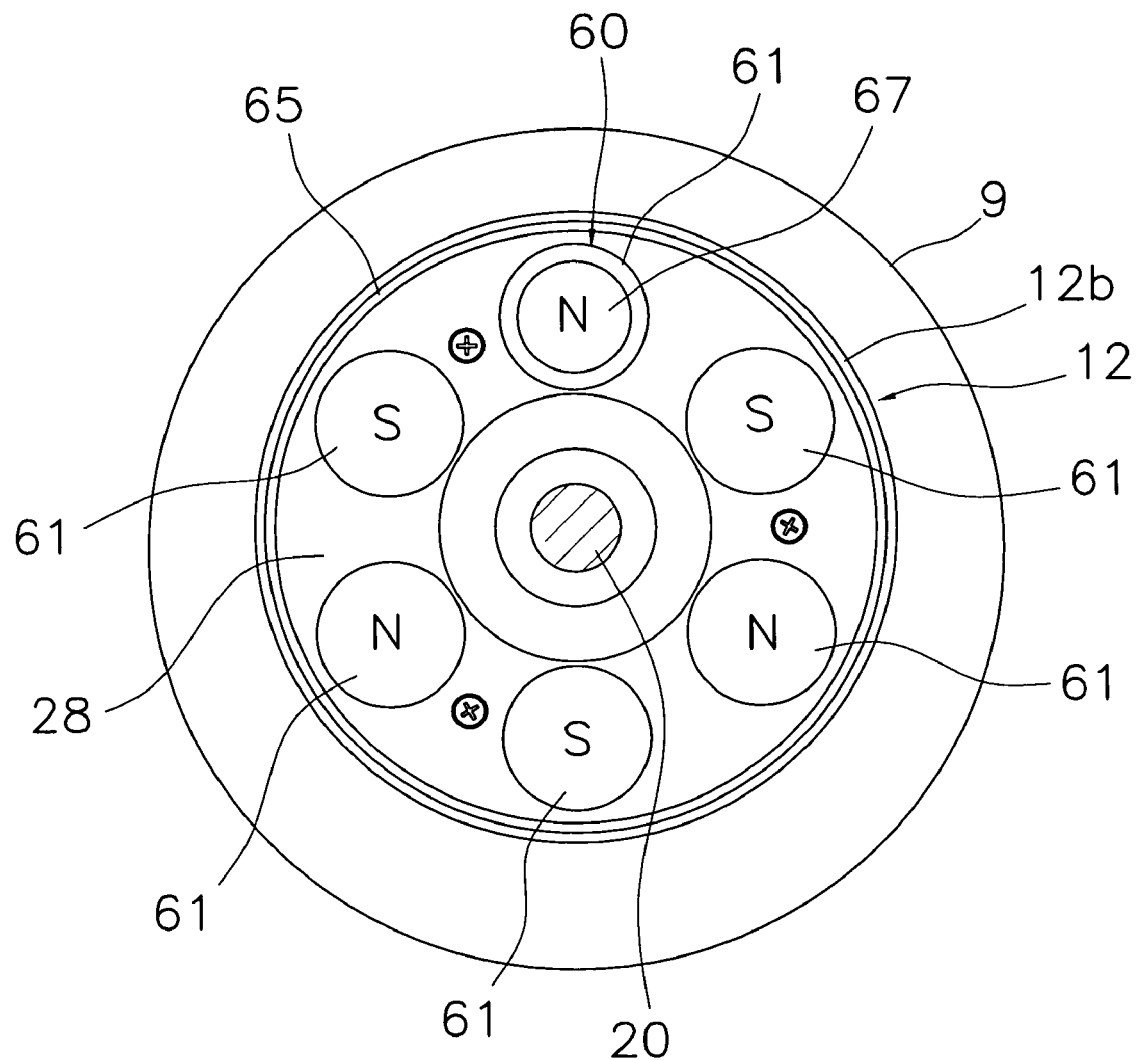
FIG. 6 is a side view of a rotor of the spool braking device on a spool of the dual-bearing reel illustrated in FIG. 1 in accordance with the first embodiment of the present invention.

The rotational velocity sensor 41 is, for example, a reflective photoelectric sensor having a light projecting part and a light receiving part. As shown in FIG. 6, the rotational velocity sensor 41 is arranged on a surface of the circuit board 66 that faces toward the flange part 12a of the spool 12. The rotational velocity sensor 41 is a sensor unit in which the light projecting part and the light receiving part are provided integrally in a case. A reading pattern 67 that reflects light emitted from the photoelectric sensor is provided on an outwardly facing surface of one of the six magnets 61 by printing, attaching a sticker, mounting a reflective plate or another appropriate method. The rotational velocity of the spool 12 is detected based on a signal from the light receiving part of the rotational velocity sensor 41. The rotational velocity of the spool 12 is used to detect the tensile force acting on the fishing line.

Referring to FIGS. 4 and 5, the circuit board 66 is a washer-like ring-shaped substrate having a circular opening at a center thereof. The circuit board 66 has a cut-out portion 66a formed along a radial direction at a section where the claw member 74 of the spool sound generating mechanism 27 is arranged. The circuit board 66 is arranged on the inside surface of the first cover 6 in such a manner as to be substantially coaxial with respect to the center axis X. A plurality of control elements, including a microcomputer and various ICs, are mounted onto front and back surfaces of the circuit board 66. The circuit board 66 is fastened to the inside surface of the first cover 6 with, for example, four screws 80 and 81. The two screws 80 also serve to fasten the fixed part 75a of the force applying member 75 of the spool sound generating mechanism 27. The display unit 46 for displaying various information is provided on the back surface of the circuit board 66 so as to be visible from the outside of the reel body 1.

Figure 7:
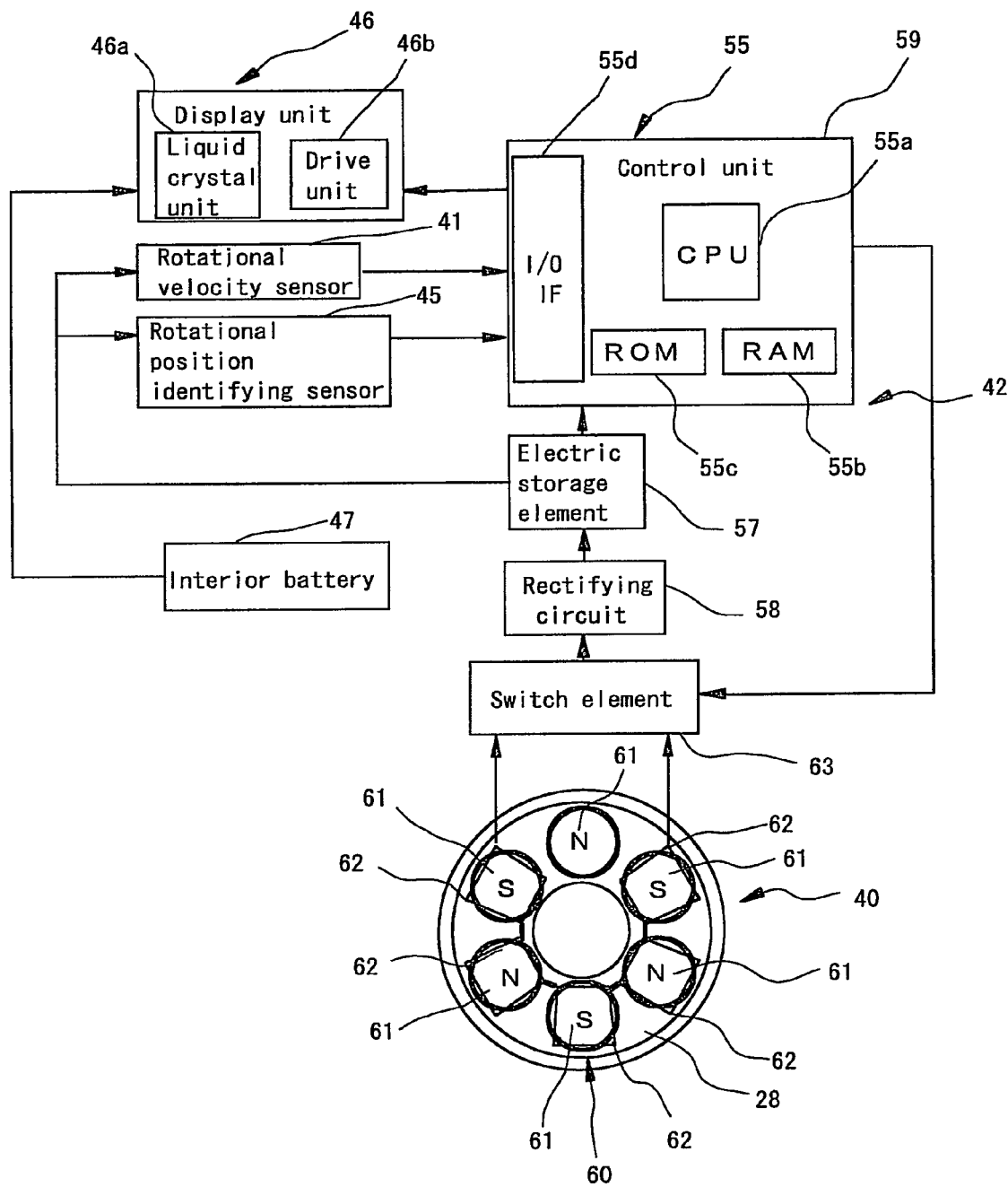
FIG. 7 is a control block diagram of the spool braking device for the dual-bearing reel illustrated in FIG. 1 in accordance with the first embodiment of the present invention.

As shown in FIG. 7, the spool control unit 42 includes a control unit 55 having a microcomputer 59 that is arranged on the circuit board 66. The microcomputer 59 includes a CPU 55a, a RAM 55b, a ROM 55c and an I/O interface 55d. The ROM 55c stores a control program and the eight braking patterns. It will be apparent to those skilled in the art from this disclosure that the precise structure and algorithms for the control unit 55 can be any combination of hardware and software that will carry out the functions of the present invention.

As shown in FIG. 7, the display unit 46, the rotational velocity sensor 41 and a rotational position identifying sensor 45 are connected to the control unit 55. The rotational position identifying sensor 45 detects a rotational position of the braking strength adjusting knob 43. The switch element 63 has a plurality of FETs with a plurality of gates. The gates of the FETs of the switch element 63 are also connected to the control unit 55. In accordance with the control program, the control unit 55 controls the on/off status of the switch element 63 based on pulse signals from the rotational velocity sensor 41 and the rotational position identifying sensor 45 using a PWM (pulse width modulated) signal having a period of, for example, about 1/1000 second. More specifically, the control unit 55 controls the on/off status of the switch element 63 according to a selected one of the eight different braking patterns. Each braking pattern corresponds to a different braking force strength level. Each braking pattern is configured to vary a duty ratio D in accordance with an amount of time elapsed during casting. Electric power from, for example, an electric storage element 57 serves as the power supply for the control unit 55. The electric power is also supplied to the rotational velocity sensor 41 and the rotational position identifying sensor 45. The electric power from an interior battery 47 such as a button battery is supplied to the display unit 46.

The display unit 46 is a rectangular segmented liquid crystal display mounted as a small unit on the back side of the circuit board 66, as shown in FIGS. 3 and 5. The display surface of the display unit 46 is arranged parallel to the surface of the circuit board 66.

Figure 10:
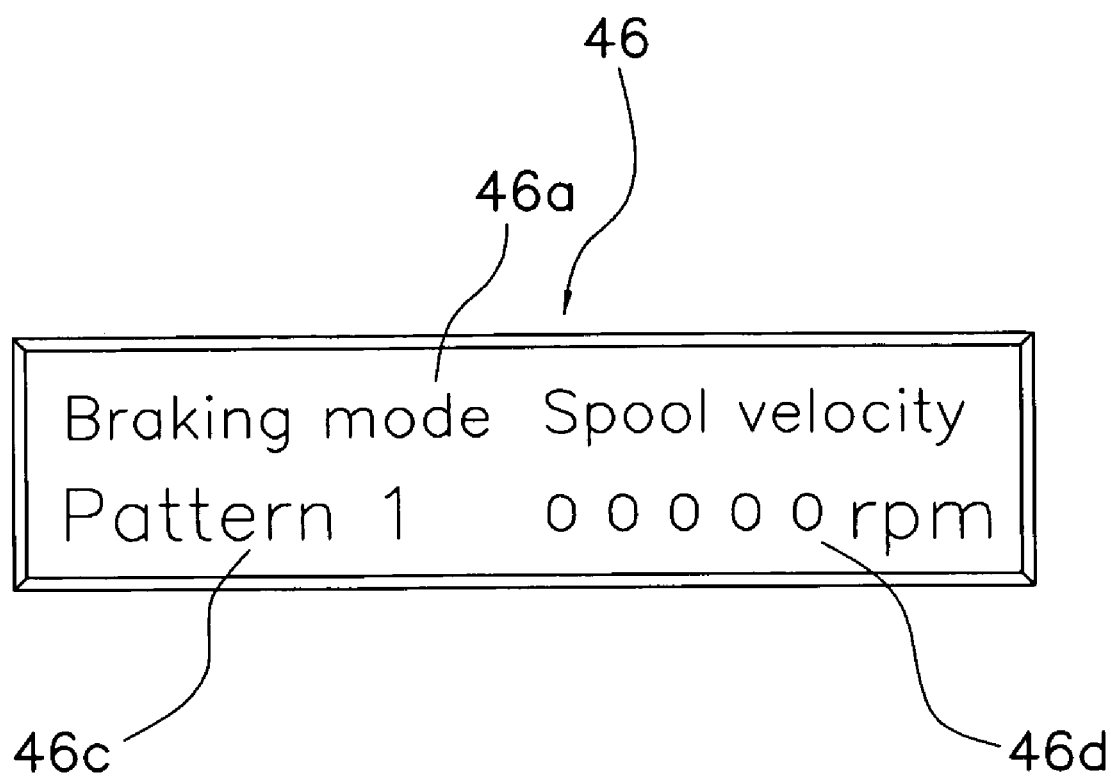
FIG. 10 is an enlarged plan view of a display unit of the spool braking device for the dual-bearing reel illustrated in FIG. 1 in accordance with the first embodiment of the present invention.

Referring to FIGS. 3, 7 and 10, the display unit 46 includes a liquid crystal part 46a, a drive unit 46b, a braking mode display region 46c and a spool velocity display region 46d. The liquid crystal part 46a has a generally rectangular external shape. The drive part 46b is mounted to the back surface of the circuit board 66 so as to face the back side of the liquid crystal part 46a. The drive part 46b drives the liquid crystal part 46a. The braking mode display region 46c is provided on a left side of the liquid crystal part 46a. The braking mode display region 46c displays a current braking mode (braking pattern, braking force level, etc.) of the spool braking mechanism 25. The spool velocity display region 46d is provided on a right side of the liquid crystal part 46a. The spool velocity display region 46d displays a current rotational velocity of the spool 12. The braking mode display region 46c is capable of displaying eight numeric values from pattern 1 to pattern 8 in a segmented liquid crystal display. The spool velocity display region 46d is capable of displaying numeric values from 00000 rpm to 99999 rpm in a segmented liquid crystal display.

Furthermore, since the braking mode of the spool braking mechanism 25 and the rotational velocity of the spool 12 are displayed on the display unit 46 during casting, a user can accurately obtain information regarding the braking mode of the spool braking mechanism 25 and the rotational velocity of the spool 12. Also, the display unit 50 improves visibility over a conventional dial or graduation mark. Since the display unit 46 is arranged on the first cover 6 side of the circuit board 66 such that the display surface thereof is parallel, the display unit 46 is easier to mount and connect to the circuit board 66.

Although in the present embodiment the display unit 46 displays the set mode of the spool braking mechanism 25 and rotational velocity of the spool 12 using numeric values, it is also acceptable to configure the display unit 46 to indicate the set mode of the spool braking mechanism 25 and the rotational velocity of the spool 12 using symbols or graphical depictions, e.g., using graphs.

Although in the present embodiment the display unit 46 uses a segmented liquid crystal display, it is also acceptable to use a dot matrix liquid crystal display. A dot matrix display enables the display unit 46 to display a large quantity of information. Additionally, the external shape of the display unit 46 is not limited to a rectangular shape. Oval shapes and other shapes are also acceptable. Also, the position of the display unit 46 is not limited to an upper portion of the first cover 6. The display unit 46 can be positioned anywhere so long as it is on the back side of the circuit board 66.

The drive unit 46b of the display unit 46 is connected to the control unit 55 so that what is displayed on the display unit 46 is controlled by controlling the drive unit 46b with the microcomputer 59. The display unit 46 is also connected to the electric storage element 57 and operates using electric power supplied from the electric storage element 57. As shown in FIG. 3, the display unit 46 is arranged in a position so as to be aligned with the rectangular window 6e when the first cover 6 and, thus, the display surface of the display unit 46 is visible from the outside of the first cover 6 through the transparent resin cover member 6f.

The electric storage element 57 is, for example, an electrolytic capacitor connected to a rectifying circuit 58. The rectifying circuit 58 is connected to the switch element 63. The rectifying circuit 58 serves to convert the alternating current outputted from the spool brake unit 40 into direct current and stabilize the voltage before the electric power is supplied to the electric storage element 57. The rectifying circuit 58 and the electric storage element 57 are mounted to the circuit board 66.

When casting is to be performed, the clutch operating lever 17 is pivoted rearward such that the clutch mechanism 21 is set to the clutch OFF state. In the clutch OFF state, the spool 12 is able to rotate freely and the fishing line reels-out vigorously from the spool 12 when casting is performed due to the weight of the tackle. When the spool 12 rotates due to casting, the magnets 61 rotate against the circumference of the coils 62 and an electric current flows in the coils 62. Thus, a braking force is applied to the spool 12 when the switch element 63 is turned on. During casting, the rotational velocity of the spool 12 gradually increases and then gradually decreases after a peak is reached.

When the tackle reaches the water, the handle assembly 2 is rotated in the reel-in direction and the clutch mechanism 21 is set to the clutch ON state by actuating the clutch return mechanism (not shown) or pivoting the clutch operating lever 17 forward. The reel body 1 is then held while waiting for a nibble.

The brake control executed by the control unit 55 during casting will now be explained summarily with reference to a graph of the brake patterns and modified patterns.

Figure 8:
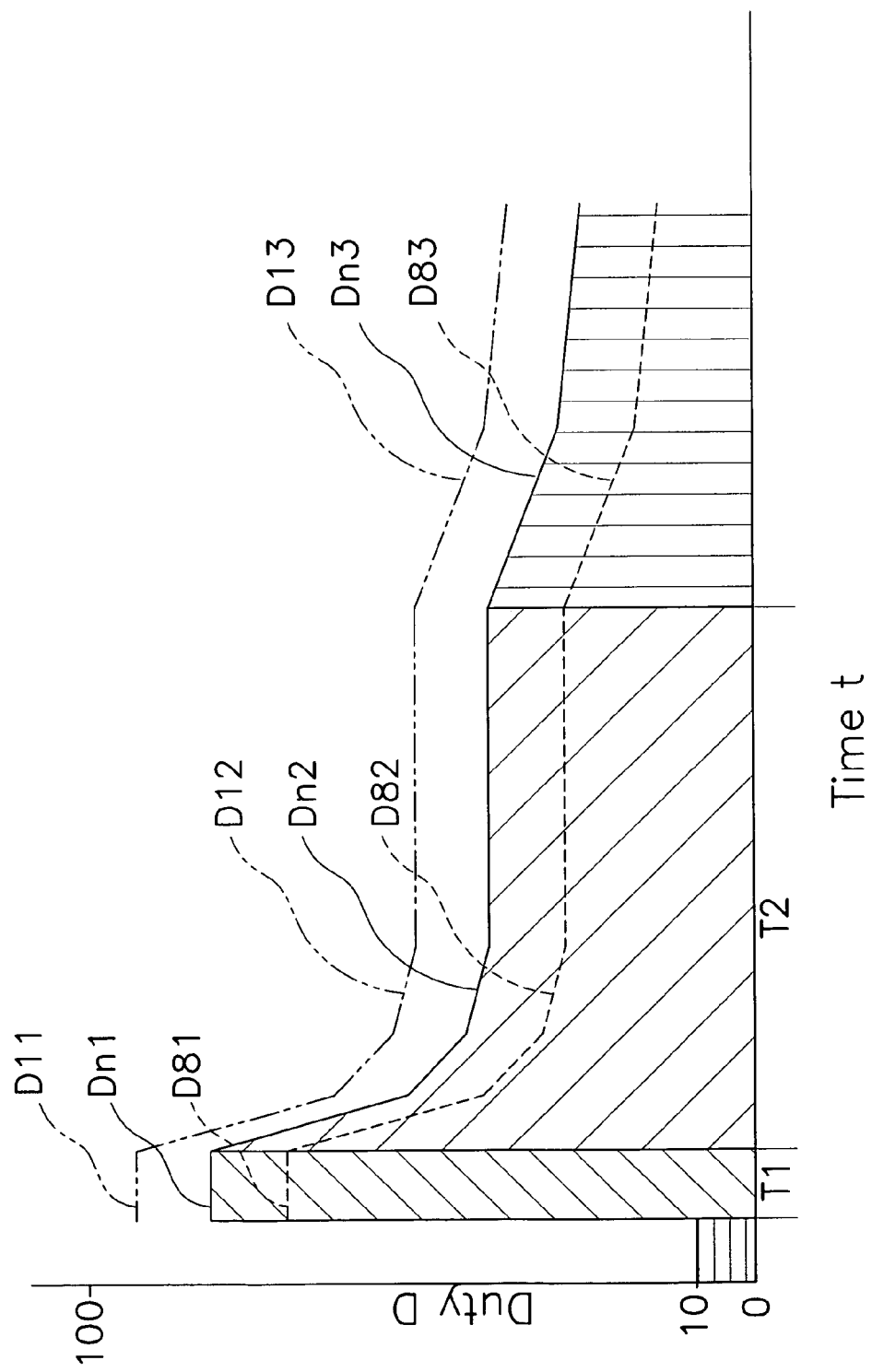
FIG. 8 is a graph showing a change in a duty ratio of braking patterns during each braking control processing implemented by the spool braking device in accordance with the first embodiment of the present invention.

The spool braking mechanism 25 operates according to any one of the eight braking patterns shown in FIG. 8. The braking pattern is a pattern wherein the braking force (duty ratio of the switch element 63) changes according to the amount of braking time that has elapsed since casting commenced. If a large braking force is applied to the spool 12 when the tensile force of the fishing line becomes equal to or smaller than a prescribed value, an attitude of the tackle or lure will invert just before the peak rotational velocity of the spool 12 is reached and a stable flight will be achieved.

A particular control is executed in order to brake the spool 12 just before the rotational velocity of the spool 12 is reached. The particular control is also executed to cause the terminal tackle to fly with a stable attitude. More specifically, during a first period at the beginning of casting, a strong braking force is applied for a short amount of time with a high duty ratio $Dn1$ (where n is an integer from 1 to 8 indicating the braking force level) and the tackle is inverted (first braking control processing). Then, during a second period, the duty ratio $Dn2$ is varied such that the braking force gradually weakens and then becomes constant at an intermediate point during the second period, resulting in gradual braking (second braking control processing). In a final, third period, the duty ratio $Dn3$ is varied such that the spool 12 is braked with a braking force that becomes gradually even weaker until the spool 12 rotational velocity falls to a prescribed rotational velocity (third braking control processing). The duty ratios $Dn1$ to $Dn3$ are changed among eight different levels depending on the setting of the braking strength adjusting knob 43. Therefore, the control unit 55 executes first to third braking control processes so as to vary the duty ratio with which the switch element 63 is turned on in accordance with the braking time.

Figure 9:
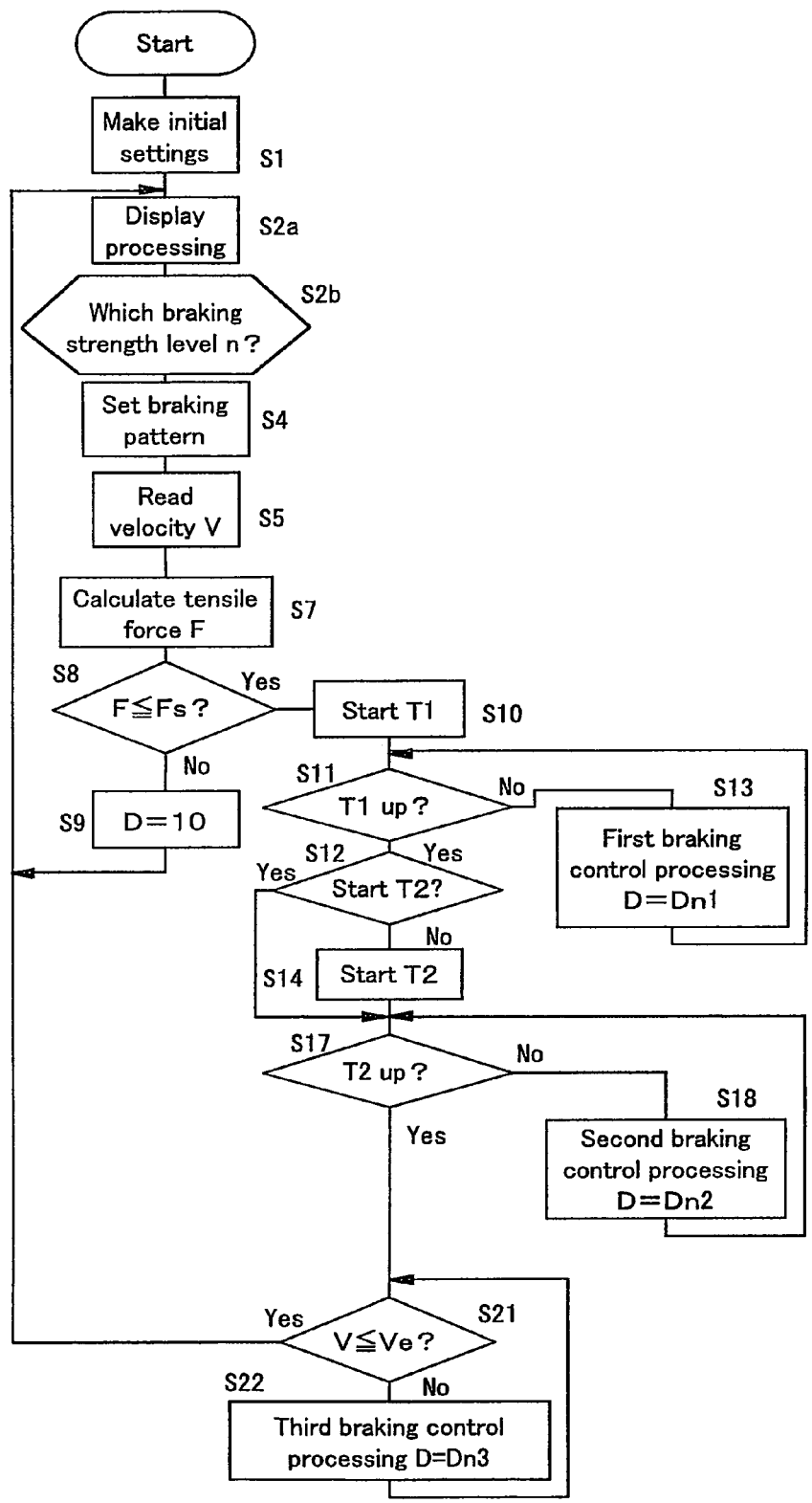
FIG. 9 is a flowchart of the control operations executed by the spool braking device for the dual-bearing reel illustrated in FIG. 1 in accordance with the first embodiment of the present invention.

Brake control operation executed by the control unit 55 will now be described in more detail with reference to the control flowchart shown in FIG. 9.

Before casting, preparatory casting is performed in order to store electricity in the electric storage element 57. The preparatory casting causes the spool 12 to rotate and electric energy to be stored in the electric storage element 57, thereby causing power to be supplied to the control unit 55. When the power is turned on, initial settings are executed in step S1. In step S1, various flags and variables are reset. In step S2a, display processing for a braking mode of the present braking mechanism 25 and the rotational velocity of the spool 12 is performed. In step S2b, the control unit 55 determines which braking force strength level n has been selected with the braking strength adjusting knob 43 based on a signal from the rotational position identifying sensor 45. In step S4, the control unit 55 reads the braking pattern corresponding to the selected strength level n from the ROM 55c and loads the braking pattern into the RAM 55b. Thereafter, the control unit 55 executes braking operations with this braking pattern until the braking strength adjusting knob 43 is changed. During the control that follows, the control unit 55 reads the duty ratio D dictated by the braking pattern from the internal RAM 55b. In step S5, the control unit 55 detects the rotational velocity V of the spool 12 at the beginning of casting based on a pulse from the rotational velocity sensor 41. In step S7, the control unit 55 calculates the tensile force F acting on the fishing line that is being reeled-out from the spool 12. Thus, the rotational velocity sensor 41 acts as a casting state detecting device to detect a casting state.

The tensile force F is calculated based on the rate of change (Δω/Δt) of the rotational velocity V of the spool 12 and the moment of inertia J of the spool 12. When the rotational velocity V of the spool 12 changes at some point in time, the difference between the rotational velocity at that point in time and the rotational velocity that the spool 12 would have if it had been rotating freely without being acted upon by a tensile force from the fishing line is due to the rotational drive force (torque) generated by the tensile force of the fishing line. Assuming that the rate of change of the rotational velocity is Δω/Δt at said point in time, the drive torque T can be expressed with the equation (1) shown below.

$$T = J \times (\Delta\omega/\Delta t) \quad (1)$$

Once the drive torque T is found using the equation (1), the tensile force can be found based on the radius (typically 15 to 20 mm) at the point where the fishing line exerts the tensile force.

In step S8, the control unit 55 determines if the tensile force F calculated based on the rate of change of the rotational velocity (Δω/Δt) and the moment of inertia J is equal to or smaller than a prescribed value Fs (e.g., any value equal to or greater than 0.5 and less than or equal to 1.5N). If the tensile force F exceeds the prescribed value Fs, the control unit 55 proceeds to step S9. If the tensile force F becomes equal to or smaller than the prescribed value Fs, the control unit 55 proceeds to step S10. Thus, the spool control unit 42 is configured to control the on/off status of the switch element 63 based on the casting state detected by the casting state detecting device.

In step S9 the control unit 55 controls the switch element 63 such that the switch element 63 turns on with a duty ratio D of 10, i.e., only 10% of the cycle period, and returns to step S2. As a result, the spool brake unit 40 brakes the spool only slightly but the spool control unit 42 operates smoothly because the spool brake unit 40 generates electricity.

In step S10, the control unit 55 starts a timer T1. The timer T1 establishes the processing time of the first braking control processing, in which the spool brake unit 40 brakes with a strong braking force. In step S11, the control unit 55 determines if the timer Ti has run out (i.e., if the time on the timer T1 is up). If not, the control unit 55 proceeds to step S13, executes the first braking control processing and returns to step S11. Step S13 is repeated until the timer T1 runs out. During the first braking control processing, the spool 12 is braked with a constant first duty ratio Dn1 for the time T1, as indicated with the hatching that slopes downward to the left in FIG. 8. The first duty ratio Dn1 is in the range of, for example, about 50 to 100% (i.e., the switch element is turned ON for 50 to 100% of the entire cycle period) or, preferably, 70 to 90%. The time period T1 is preferably in the range of 0.1 to 0.3 second. By braking with values in these ranges, the spool 12 is braked more easily before the peak rotational velocity is reached.

The first duty ratio Dn1 is shifted up and down depending on the braking force strength level n that is selected. In this embodiment, the duty ratio D11 is the largest and corresponds to the largest braking force (n=1). The duty ratios of the remaining strength levels (n=2 to 8) become gradually smaller. Thus, by applying a strong braking force matched to the terminal tackle for a short period of time, the attitude of the terminal tackle is inverted from a portion where the fishing line is attached and the terminal tackle flies in such a fashion that the portion thereof where the fishing line is attached is in front. As a result, the attitude of the terminal tackle is stabilized and the terminal tackle flies a greater distance.

Meanwhile, when the timer T1 runs out, the control unit 55 resets the timer T1 and proceeds from step S11 to step S12. In step S12, the control unit 55 determines if the timer T2 has already been started. If the timer T2 has started, the control unit 55 proceeds to step S17. If the timer T2 has not started, the control unit 55 proceeds to step S14 and starts the timer T2. The timer T2 establishes the processing time of the second braking control processing.

In step S17, the control unit 55 determines if the timer T2 has run out. If not, the control unit 55 proceeds to step S18 and executes the second braking control processing until the timer T2 runs out. In the second braking processing, i.e., during the second prescribed time period T2, the spool 12 is braked with a duty ratio Dn2 that is initially decreased rapidly and then gradually decreased until finally it is held at a fixed value, as indicated in FIG. 8 with hatching that slopes downward to the right. It is preferable for the minimum value of the duty ratio Dn2 to be in the range of about 30 to 70%. It is also preferable for the second prescribed time period T2 to be from about 0.3 to 2 seconds long. When the timer T2 runs out, the control unit 55 resets the timer T2 and proceeds from step S17 to step S21.

In step S21, the control unit 55 determines if the velocity V is equal to or smaller than a braking end velocity Ve. If the velocity V is larger than the braking end velocity Ve, the control unit 55 proceeds to step S22. In step S22, the control unit 55 executes the third braking control processing. As indicated with vertical striped hatching in FIG. 8, when executing the third braking control processing, the control unit 55 controls the braking force with a duty ratio Dn3 that varies over time in a manner similar to the second braking control processing, i.e., such that the rate at which the duty ratio Dn3 decreases becomes gradually smaller. When the velocity V becomes equal to or smaller than the braking end velocity Ve, the control unit 55 returns to step S2.

With this embodiment, the spool 12 is braked with a strong braking force before it reaches a peak rotational velocity and the tensile force rapidly increases from a value that is equal to or below the first prescribed value Fs. Thus, backlashing can be prevented and the terminal tackle flies in a stable manner. As a result, backlashing can be prevented while enabling the lure to be cast a farther distance with a stable attitude.

Also, since duty ratios and braking times used during the three braking control processes are varied in accordance with the rotational velocity of the spool 12 at the beginning of casting, the spool 12 is braked with different duty ratios and braking times depending on the rotational velocity of the spool 12 even if the selected braking pattern is the same. As a result, it is not necessary to manually adjust the braking force when the rod is cast. Thus, the burden placed on the user to adjust the braking force is reduced.

In the present embodiment, the present invention is described using a dual-bearing reel that does not have a level wind mechanism. However, it will be apparent to one of ordinary skill in the art from this disclosure that the present invention can also be applied to dual-bearing reels having level wind mechanisms. In such a case, a cut-out portion is provided in the circuit board 66 in order to avoid interference with a threaded shaft, guide shaft, etc., of the level wind mechanism.

Although in the present embodiment the tensile force acting on the fishing line is detected as the casting state, the invention is not limited to using the tensile force as the casting state. For example, it is also acceptable to detect the rotational velocity of the spool and use the detected rotational velocity as the casting state.

As used herein, the following directional terms "forward, rearward, above, downward, vertical, horizontal, below and transverse" as well as any other similar directional terms refer to those directions of a device equipped with the present invention. Accordingly, these terms, as utilized to describe the present invention should be interpreted relative to a device equipped with the present invention.

SECOND EMBODIMENT

Figure 11:
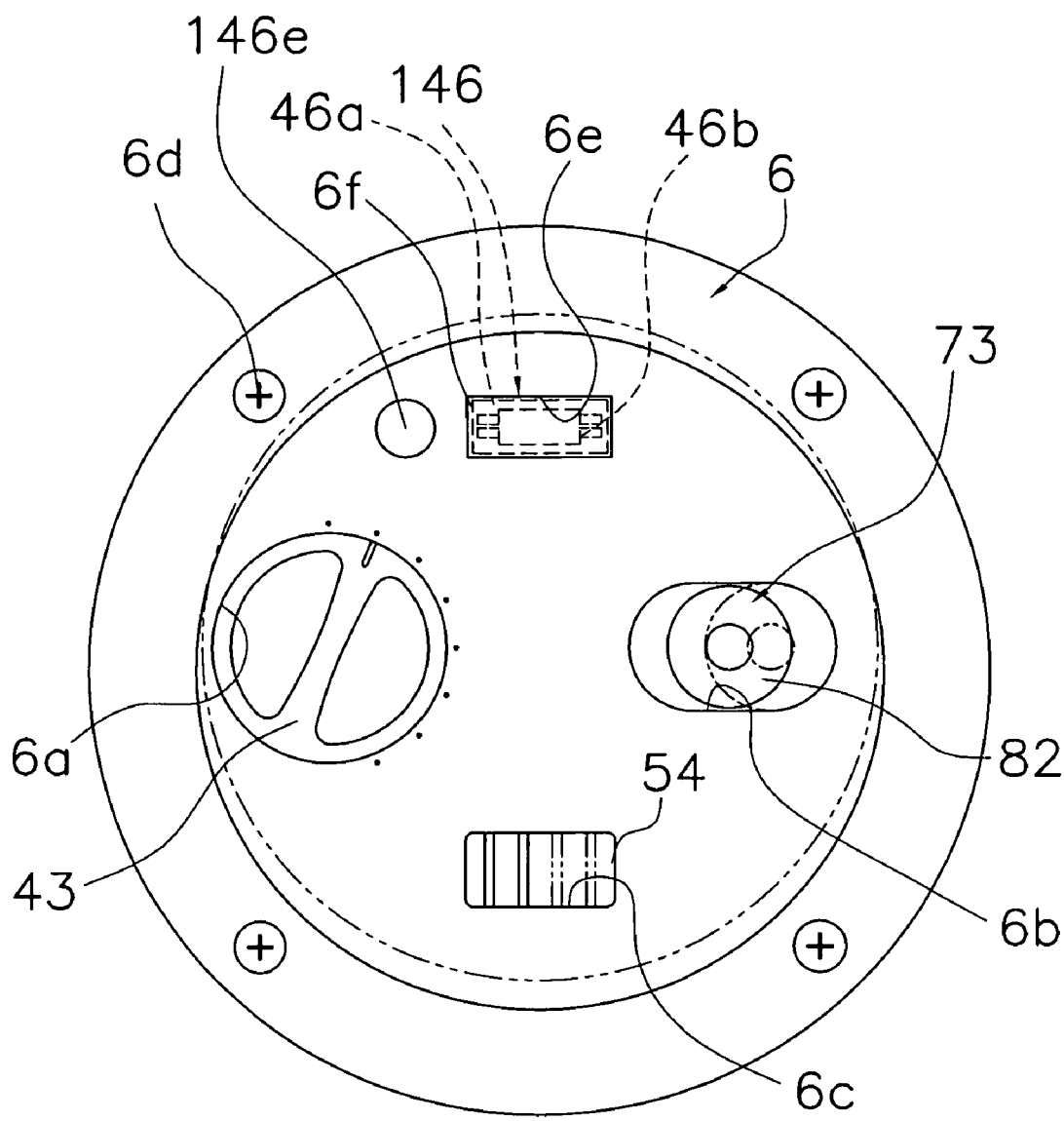
FIG. 11 is a side view of a left side of a dual-bearing reel equipped with a spool braking device in accordance with a second embodiment of the present invention.

Referring now to FIG. 11, a spool braking device in accordance with a second embodiment will now be explained. In view of the similarity between the first and second embodiments, the parts of the second embodiment that are identical to the parts of the first embodiment will be given the same reference numerals as the parts of the first embodiment. Moreover, the descriptions of the parts of the second embodiment that are identical to the parts of the first embodiment may be omitted for the sake of brevity.

In the first embodiment the display unit 46 displays only the set mode of the spool braking mechanism 25 and the rotational velocity of the spool 12. The spool braking device of the second embodiment is the same as the first embodiment except a manually operated part 46e'' is provided in a display unit 46'', as shown in FIG. 11. The manually operated part 46e'' is for changing the content displayed on the display unit 46''. The display unit 46'' is configured to display various other content than that displayed in the first embodiment by changing a display mode. The manually operated part 46e'' is, for example, a press button switch provided on the circuit board 66 such that it is exposed to the outside of the first cover 6, thereby enabling the display mode of the display unit 46'' to be changed easily.

THIRD EMBODIMENT

Figure 12:
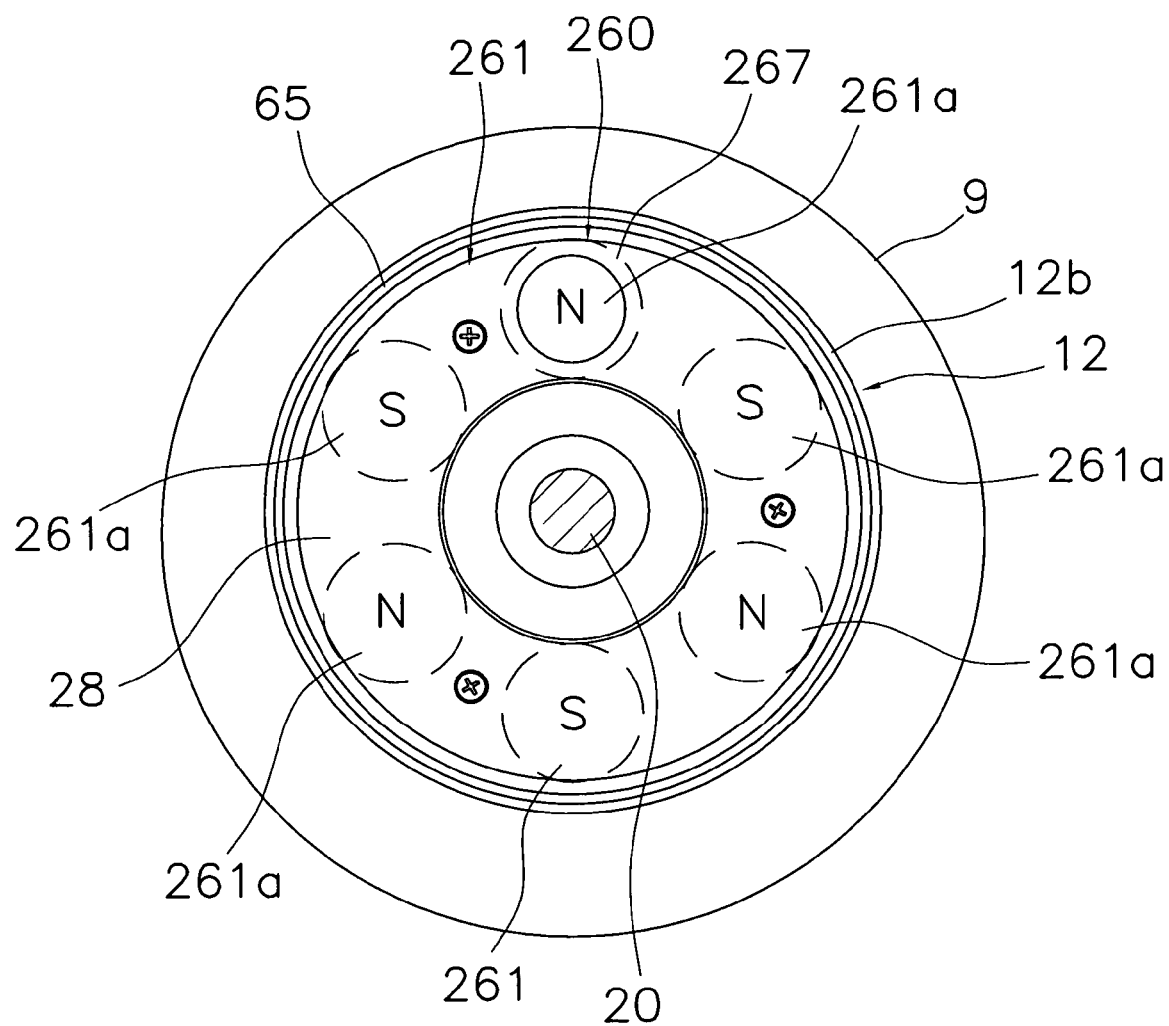
FIG. 12 is a side view of a rotor of the spool braking device on a spool of the dual-bearing reel illustrated in FIG. 1 in accordance with the third embodiment of the present invention.

Referring now to FIG. 12, a spool braking device in accordance with a third embodiment will now be explained. In view of the similarity between the first and third embodiments, the parts of the third embodiment that are identical to the parts of the first embodiment will be given the same reference numerals as the parts of the first embodiment. Moreover, the descriptions of the parts of the third embodiment that are identical to the parts of the first embodiment may be omitted for the sake of brevity.

In the third embodiment, a ring shaped forming magnet 261 has a plurality of magnetic poles 261a. The ring shaped forming magnet 261 is provided in a rotor 260. The ring shaped forming magnet 261 is made of a molded resin mixed with metal particles or molded sintered metal.

The term "configured" as used herein to describe a component, section or part of a device includes hardware and/or software that is constructed and/or programmed to carry out the desired function.

The terms of degree such as "substantially", "about" and "approximately" as used herein mean a reasonable amount of deviation of the modified term such that the end result is not significantly changed. For example, these terms can be construed as including a deviation of at least ±5% of the modified term if this deviation would not negate the meaning of the word it modifies.

While only selected embodiments have been chosen to illustrate the present invention, it will be apparent to those skilled in the art from this disclosure that various changes and modifications can be made herein without departing from the scope of the invention as defined in the appended claims. Furthermore, the foregoing descriptions of the embodiments according to the present invention are provided for illustration only, and not for the purpose of limiting the invention as defined by the appended claims and their equivalents. Thus, the scope of the invention is not limited to the disclosed embodiments.

What is claimed is:

1. A spool braking device for a dual-bearing reel comprising:
    a spool braking unit configured to brake a spool, the spool braking unit including a rotor having a plurality of magnetic poles that are arranged along a rotational direction with alternating polarities and a plurality of coils arranged to be spaced apart in a circumferential direction, the rotor being configured and arranged to rotate together with the spool, the coils having end faces that are arranged to face a side face of the rotor, the coils being connected in series to form a coil sequence and each of the coils having a winding diameter that is larger than a full length of the coil in a direction parallel to a center axis of the spool;
    a switch element connected to both ends of the coil sequence;
    a casting state detecting device configured to detect a casting state; and
    a spool control device configured to control an on/off status of the switch element based on the casting state.

2. The spool braking device as recited in claim 1, wherein the casting state detecting device has a tensile force detecting device for detecting the casting state that is configured to detect a tensile force acting on a fishing line dispensed from the spool during casting.

3. The spool braking device as recited in claim 2, wherein the coils are arranged along a circle that is centered on the center axis and aligned in a plane substantially perpendicular to the center axis, each of the coils is wound in the shape of a fan and centered on an axis substantially parallel to the center axis, and the full length of the coil is equal to or less than ¼ of a diagonal dimension of the coil that corresponds to a maximum value of the winding diameter.

4. The spool braking device as recited in claim 2, wherein the spool control device has a circuit board configured and arranged to face an end of the spool and a plurality of control elements mounted to the circuit board, and the coils are attached to the circuit board.

5. The spool braking device as recited in claim 4, further comprising
    a display unit configured to display various information and disposed on the circuit board so as to be exposed to an outer surface.

6. The spool braking device as recited in claim 5, further comprising
    an internal battery configured to provide electric power to drive the display unit.

7. The spool braking device as recited in claim 2, wherein the spool control device is configured to electrically control the spool braking unit to apply a prescribed first braking force to the spool for a duration of a first prescribed time period when the tensile force detected by the tensile force detecting device is equal to or smaller than a first prescribed value.

8. The spool braking device as recited in claim 1, wherein the coils are arranged along a circle that is centered on the center axis and aligned in a plane substantially perpendicular to the center axis, each of the coils is wound in the shape of a fan and centered on an axis substantially parallel to the center axis, and the full length of the coil is equal to or less than ¼ of a diagonal dimension of the coil that corresponds to a maximum value of the winding diameter.

9. The spool braking device as recited in claim 8, wherein
the spool control device is configured to electrically control the spool braking unit to apply a prescribed first braking force to the spool for a duration of a first prescribed time period when the tensile force detected by the tensile force detecting device is equal to or smaller than a first prescribed value.

10. The spool braking device as recited in claim 8, wherein
the rotor has a plurality of magnets that are configured to be fixed to a flange part of the spool and the rotational direction is centered about the center axis.

11. The spool braking device as recited in claim 8, wherein
the spool control device has a circuit board configured and arranged to face an end of the spool and a plurality of control elements mounted to the circuit board, and the coils are attached to the circuit board.

12. The spool braking device as recited in claim 11, wherein
the spool control device is configured to electrically control the spool braking unit to apply a prescribed first braking force to the spool for a duration of a first prescribed time period when the tensile force detected by the tensile force detecting device is equal to or smaller than a first prescribed value.

13. The spool braking device as recited in claim 11, wherein
the circuit board includes a washer-shaped ring member that forms a cut-out portion along a radial direction, and the ring member is substantially coaxial with the center axis of the spool.

14. The spool braking device as recited in claim 1, wherein
the rotor has a plurality of magnets that are configured to be fixed to a flange part of the spool and the rotational direction is centered about the center axis.

15. The spool braking device as recited in claim 1, wherein
the spool control device has a circuit board configured and arranged to face an end of the spool and a plurality of control elements mounted to the circuit board, and the coils are attached to the circuit board.

16. The spool braking device as recited in claim 15, wherein
the circuit board includes a washer-shaped ring member that forms a cut-out portion along a radial direction, and the ring member is substantially coaxial with the center axis of the spool.

17. The spool braking device as recited in claim 15, further comprising
a display unit configured to display various information and disposed on the circuit board so as to be exposed to an outer surface.

18. The spool braking device as recited in claim 17, wherein
the display unit has a display surface that is substantially parallel to a surface of the circuit board.

19. The spool braking device as recited in claim 18, further comprising
an internal battery configured to provide electric power to drive the display unit.

20. The spool braking device as recited in claim 1, wherein
the rotor has a ring shaped magnet with the magnetic poles that are arranged along the rotational direction with alternating polarities.

* * * * *